Jan. 7, 1958 H. KAHN 2,818,755
ZIPPER REPAIR TOOL
Filed Sept. 12, 1955
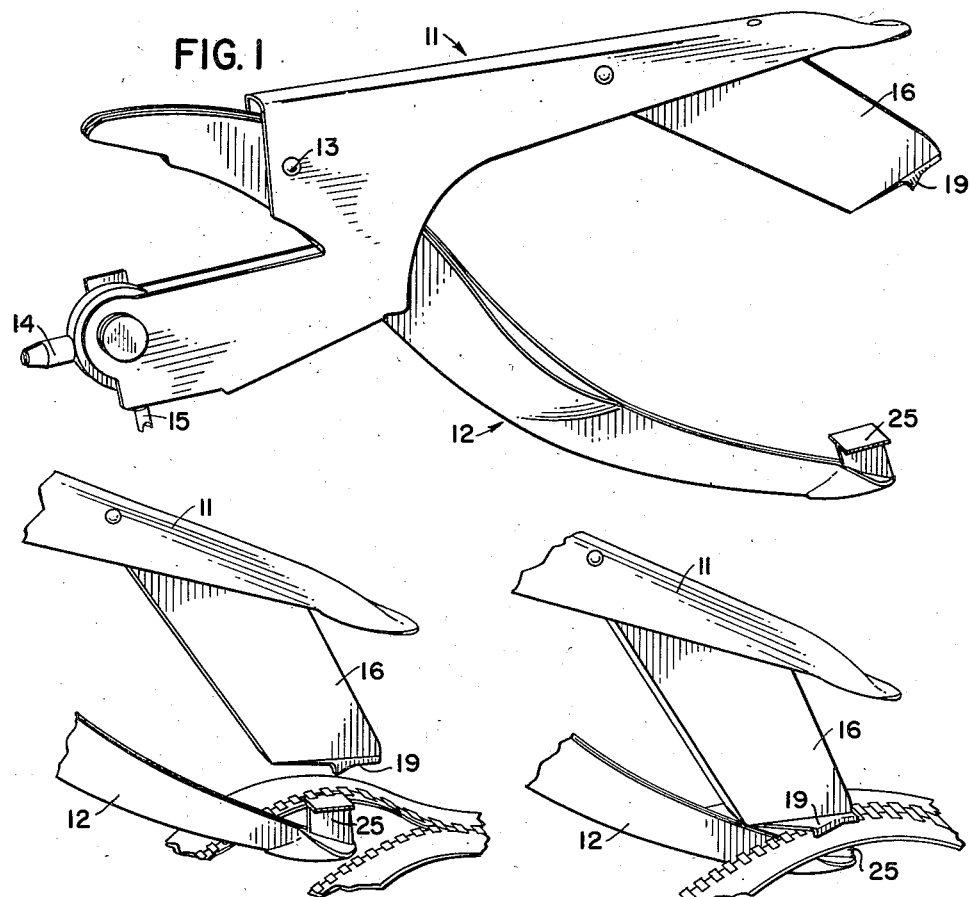
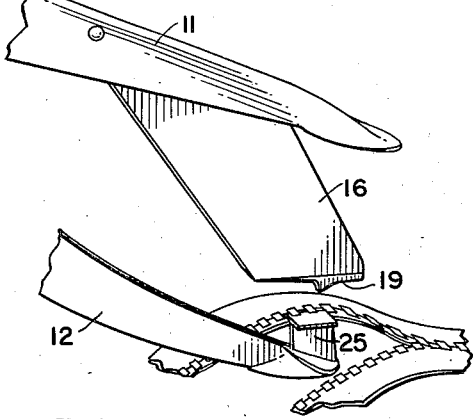
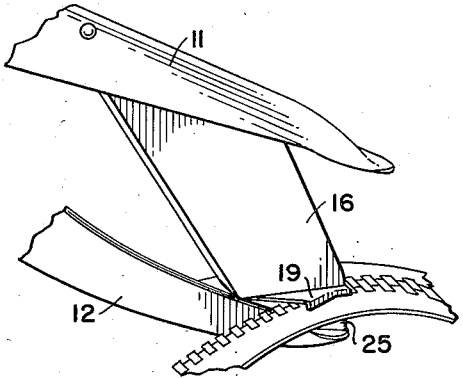
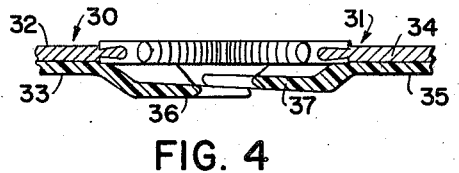
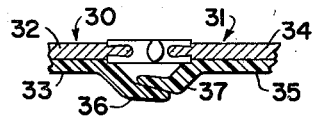
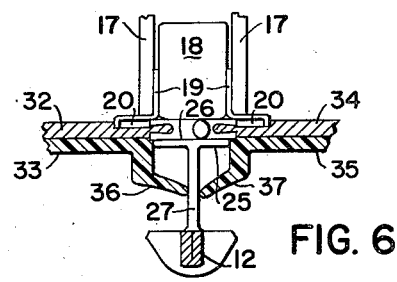
INVENTOR.
HENRY KAHN
BY
Ely, Pearne & Gordon
ATTORNEYS United States Patent Office 2,818,755
Patented Jan. 7, 1958

2,818,755

ZIPPER REPAIR TOOL

Henry Kahn, Cleveland, Ohio

Application September 12, 1955, Serial No. 533,567

2 Claims. (Cl. 81—5.1)

This invention relates to zipper repair tools and particularly to a tool for meshing a zipper incident to its repair where the zipper is provided with coextensive pressure-sealing ribs of rubber or similar material, such as those commonly in use today on convertible tops for automobiles.

The repair of zippers generally requires a tool to mesh the zipper prior to replacement or repair of the slider. Repair of zippers having coextensive pressure-sealing ribs has been impractical because heretofore no tool has been provided which can successfully mesh the zipper proper without snubbing or binding against the soft coextensive sealing ribs which cover one side of the zipper and render it leakproof. As a consequence, broken zippers of this type generally require complete replacement at a cost which is excessive when compared to the total cost of the closure, such as a convertible top, in connection with which the zipper is used.

The general object of the present invention is to provide a simple means to mesh zippers of the type provided with sealing ribs.

Another object of the invention is to provide a zipper-meshing tool which can be employed with equal ease on non-sealing type or conventional zippers.

An additional object of the invention is to make it practical to repair, in the field or shop, zippers of the sealing type, thus avoiding the wasteful and expensive complete removal and replacement of zippers which has been necessary heretofore when it was desired to maintain convertible tops in good repair.

These and other objects and advantages of the invention will perhaps become more clear from the following description, by way of example, of a presently preferred embodiment of the invention.

In the accompanying drawings:

Figure 1 is a perspective view of a tool embodying the invention.

Figure 2 is a view showing a portion of the tool shown in Figure 1 in preliminary position in association with a sealing type zipper which is to be meshed.

Figure 3 is a view similar to Figure 2 illustrating the position during actual meshing.

Figure 4 is an enlarged cross-section of an unmeshed portion of a sealing type zipper which is to be meshed.

Figure 5 is an enlarged cross-section of a meshed portion of the zipper shown in Figure 4.

Figure 6 is an enlarged cross-section similar to Figure 5 but showing certain operative portions of the invention in engagement with the zipper.

As shown in Figure 1 a tool may be provided consisting of two body portions generally indicated at 11 and 12 which are pivoted to each other at pivot point 13, the right end of the body portions 11 and 12 (as seen in Figure 1) preferably being formed as elements of a squeeze grip, as will be clear from the drawing. On the left end of the body portion 11 may be mounted a small turret which can be indexed from position to position to select for use one of several units such as a slide tightener 14 and a tooth tightener 15. These several units selectively coact, of course, with the left end of the body portion 12 in various self-evident repair functions not presently of immediate pertinence.

Forming part of the body portion 11 is a member 16 which may comprise a pair of spaced walls 17 (see Figure 6) between the lower ends of which is received an assembly comprising a small block 18 and side members 19 which together define an element equivalent to the upper wing of a conventional slider, including a face edged on two sides by coverging surfaces of flanges 20 which briefly extend parallel to each other at their converged ends.

Mounted on the right end of the body portion 12 (as viewed in Figure 1) is an element 25 having a substantially planar top face 26. A supporting stem 27 is fixed to the underside of the element 25 and extends laterally centrally downwardly therefrom to the body portion 12, which together with body portion 11 constitutes in combination a foundation or base which may be regarded collectively as a mounting means for the more immediately operative elements such as the assembly 18, 19 and the element 25. The elements 25 and 27 may also be described as a short T-beam, the element 25 comprising the top of the T and extending from the underside of the top of the T. When the element 25 and the assembly 18, 19 are brought together by pressure on the handle portions of the members 11 and 12 (which are normally urged apart by suitable conventional spring means, not shown), the top face 26 extends across a majority of the minimum distance between the converging flanges or surfaces 20 and centrally overlies the face of the assembly 18, 19 which is edged by the flanges or surfaces 20. In this position the stem 27 is midway between the converging surfaces 20 in the sense that, although the stem 27 is offset from the surfaces 20, it is substantially equidistant laterally from each of them. In other words, at least in the position when the assembly 18, 19 and element 25 are brought together, the stem 27 lies in the midplane between the converging surfaces 20. This is a preferred but not necessarily vital feature of the invention.

A typical pressure-sealing zipper is perhaps most clearly illustrated in Figures 4, 5 and 6. It constitutes stringers generally indicated at 30 and 31. The stringer 30 comprises a lamination of fabric 32 and rubber 33, and the stringer 31 comprises a lamination of fabric 34 and rubber 35. The rubber web 33 includes a lip 36, and the rubber web 35 includes a lip 37—the lips 36 and 37 cooperating in providing a sealed closure when the zipper teeth 38, crimped to each stringer, are meshed together.

When the zipper is to be meshed, the element 25 is placed on the underside of the zipper by inserting this element between the bottom of one of the rows of zipper teeth and its associated lip 36 or 37, as shown in Figure 2; it is then shifted to the juncture of the meshed and unmeshed portions of the zipper to underlie both rows of zipper teeth and lie in included position between these rows and the lips 36 and 37. The assembly 18, 19 is then clamped downwardly on the top of the zipper with firm pressure, and the tool is pulled along the zipper in the condition shown in Figure 3, causing the zipper to mesh to the extent desired. The tool is released simply by releasing manual clamping pressure.

It will be noted that both the assembly 18, 19 and the element 25 are in sharply biased position with respect to the general direction of extent of the body portions 11 and 12 so that the main body of the tool may be held to the side of the zipper which is to be meshed, avoiding highly troublesome interference between the tool and the zipper stringers and panels associated with the stringers. It is for this reason also that the handle end of the body portion 12 is preferably thin and curved as shown in the drawings.

The parts may preferably be proportioned so that the assembly 18, 19 and the element 25 cannot be engaged when one of the units such as 14 or 15 is indexed to operative position, but only when the turret wheel is indexed to a blank position.

If desired, the walls 17 may be adjustably spaced by a turnscrew (not shown) to accept assemblies 18, 19 of various sizes for repair of zippers of various sizes. This and similar possible modifications and elaborations should make it abundantly clear that the invention is not limited to the precise details of the above disclosure which is intended merely to show the presently preferred embodiment of the invention by way of example. The scope of the invention is defined in the following claims.

What is claimed is:

1. In a zipper repair tool, mounting means, a pair of opposed stringer-engaging means, one of said pair of stringer-engaging means comprising a first face edged on two sides by opposing upstanding converging flanges which briefly extend parallel to each other at their converged ends whereby said one stringer-engaging means substantially duplicates the top wing of a conventional slider body, said one of said pair of stringer-engaging means being mounted on said mounting means, the other of said pair of stringer-engaging means comprising an element having a substantially planar top face, a supporting stem fixed to the underside of said element and extending laterally centrally downwardly therefrom to said mounting means and being affixed to said mounting means, said mounting means comprising at least two bodies linked together for movement with respect to each other in defined relationship, said one of said pair of stringer-engaging means being associated with one of said bodies and said other of said pair of stringer-engaging means being associated with another of said bodies, each of said pair of stringer-engaging means being positioned with respect to its associated body to be in juxtaposed facing relationship to the other of said pair of stringer-engaging means in one relative position of said bodies and to back away from said juxtaposed facing relationship upon relative movement of said bodies to other relative positions, the conformation of each of such pair of stringer-engaging means being such that in juxtaposed facing relationship said planar top face overlies said first face, and the width of said planar top extends across a majority of the minimum distance between said flanges.

2. In a zipper repair tool, mounting means, a pair of opposed stringer-engaging means, one of said pair of stringer-engaging means comprising a face edged on two sides by opposing upstanding converging flanges which briefly extend parallel to each other at their converged ends for substantially duplicating the top wing of a conventional slider body, said one of said pair of stringer-engaging means being mounted on said mounting means, the other of said pair of stringer-engaging means comprising the top of a short T-beam, said T-beam having a stem fixed to the underside of said top and extending downwardly therefrom to said mounting means and being affixed to said mounting means, said mounting means comprising at least two bodies linked together for movement with respect to each other in defined relationship, said one of said pair of stringer-engaging means being associated with one of said bodies and said other of said pair of stringer-engaging means being associated with another of said bodies, each of said pair of stringer-engaging means being positioned with respect to its associated body to be in juxtaposed facing relationship to the other of said pair of stringer-engaging means in one relative position of said bodies and to back away from said juxtaposed facing relationship upon relative movement of said bodies to other relative positions, the conformation of each of said pair of stringer-engaging means being such that in juxtaposed facing relationship said top of said T-beam overlies said face, and the width of said top of said T-beam extends across a majority of the minimum distance between said flanges.

References Cited in the file of this patent

UNITED STATES PATENTS

| 1,452,372 | Gomez | Apr. 17, 1923 |
| 2,579,207 | Scheib | Dec. 18, 1951 |

FOREIGN PATENTS

| 557,805 | Germany | Aug. 27, 1932 |